United States Patent
Biller et al.

(10) Patent No.: US 9,471,797 B1
(45) Date of Patent: Oct. 18, 2016

(54) AUTOMATIC ROLE TUNING IN A COMPUTER SYSTEM

(71) Applicant: International Business Machines Corporation, Armonk, NY (US)

(72) Inventors: Ofer Biller, Midreshet Ben Gurion (IL);
Boris Rozenberg, Ramat Gan (IL);
David Rozenblat, Nes Harim (IL);
Oded Sofer, Jerusalem (IL)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 14/962,464

(22) Filed: Dec. 8, 2015

(51) Int. Cl.
G06F 21/60 (2013.01)

(52) U.S. Cl.
CPC ................................. *G06F 21/604* (2013.01)

(58) Field of Classification Search
CPC ............. G06F 21/604; G06F 21/6218; G06F 2221/2141; G06F 2221/2145; G06F 2221/2113; G06F 21/62; H04L 63/105; H04L 63/101; H04L 63/104
See application file for complete search history.

(56) References Cited

U.S. PATENT DOCUMENTS

| | | | |
|---|---|---|---|
| 8,271,527 B2 | 9/2012 | Frieder et al. | |
| 2006/0047657 A1* | 3/2006 | Frieder | G06F 21/6218 |
| 2006/0090208 A1* | 4/2006 | Smith | G06F 21/604 |
| | | | 726/26 |
| 2008/0022370 A1* | 1/2008 | Beedubail | G06F 21/6218 |
| | | | 726/4 |
| 2009/0276824 A1* | 11/2009 | Rafiq | G06F 21/604 |
| | | | 726/1 |
| 2010/0043051 A1* | 2/2010 | Deputat | H04L 63/20 |
| | | | 726/1 |
| 2010/0100941 A1* | 4/2010 | Eom | G06F 21/6218 |
| | | | 726/4 |
| 2010/0306817 A1* | 12/2010 | Grebenik | G06F 21/604 |
| | | | 726/1 |
| 2011/0296414 A1* | 12/2011 | Hinojosa | G06F 21/6218 |
| | | | 718/100 |
| 2012/0042354 A1* | 2/2012 | Vitiello | G06Q 10/06 |
| | | | 726/1 |
| 2012/0047575 A1* | 2/2012 | Baikalov | G06F 21/577 |
| | | | 726/21 |
| 2012/0246098 A1 | 9/2012 | Chari et al. | |
| 2013/0024909 A1* | 1/2013 | Morita | G06F 21/604 |
| | | | 726/1 |

(Continued)

FOREIGN PATENT DOCUMENTS

CN 102930226 A 2/2013

OTHER PUBLICATIONS

Z. Yu; R. Wong; C. H. Chi, "Efficient Role Mining for Context-Aware Service Recommendation Using a High-Performance Cluster," in IEEE Transactions on Services Computing , vol. PP, No. 99.*

(Continued)

*Primary Examiner* — Darren B Schwartz
(74) *Attorney, Agent, or Firm* — Cantor Colburn LLP; David Quinn

(57) ABSTRACT

Embodiments are directed to a computer-based system for tuning roles. The system includes a memory and a processor system communicatively coupled to the memory. The processor system is configured to receive at least one database access log file and existing role definitions of the system. For each role, the processor system is further configured to create an existing user to permission assignment (EUPA) based at least in part on the existing role definitions of the system. For each role, the processor system is further configured to identify logical sessions in the at least one database access log file and create a demonstrated user to permission assignment (DUPA) formed at least in part from data of the identified logical sessions. For each role, the processor system is further configured to create a final user to permission assignment (FUPA) including a function of the EUPA and the DUPA.

17 Claims, 5 Drawing Sheets

(56) References Cited

U.S. PATENT DOCUMENTS

| | | | |
|---|---|---|---|
| 2014/0129273 A1* | 5/2014 | Versteeg | G06F 17/30286 705/7.14 |
| 2014/0196104 A1* | 7/2014 | Chari | H04L 63/102 726/1 |
| 2014/0215604 A1 | 7/2014 | Giblin et al. | |

OTHER PUBLICATIONS

W. Ye, R. Li and H. Li, "Role Mining Using Boolean Matrix Decomposition with Hierarchy," 2013 12th IEEE International Conference on Trust, Security and Privacy in Computing and Communications, Melbourne, VIC, 2013, pp. 805-812.*

Jaideep Vaidya, Vijayalakshmi Atluri, and Qi Guo. 2007. "The Role Mining Problem: Finding a Minimal Descriptive Set of Roles." In Proceedings of the 12th ACM symposium on Access control models and technologies (SACMAT '07). ACM, New York, NY, USA, 175-184.*

A. Baumgrass and M. Strembeck, "An Approach to Bridge the Gap between Role Mining and Role Engineering via Migration Guides," Availability, Reliability and Security (ARES), 2012 Seventh International Conference on, Prague, 2012, pp. 113-122.*

Zhongyuan Xu and Scott D. Stoller. 2012. Algorithms for mining meaningful roles. In Proceedings of the 17th ACM symposium on Access Control Models and Technologies (SACMAT '12). ACM, New York, NY, USA, 57-66.*

Lu et al., "Towards User-Oriented RBAC Model" Journal of Computer Security; 23, 1; 107-129; Journal of computer Security by IOS Press; 2015. (16 pgs).

Huang et al., "Applying language modeling to session identification from database trace logs." Received: Feb. 16, 2005 /Revised: Jan. 8, 2006 / Accepted: Jan. 30, 2006 /Published online: Mar. 24, 2006 C. Springer-Verlag London Limited 2006. (32 pgs).

Chandola et al., "Anomaly Detection: A Survey." ACM Computing Surveys, vol. 41, No. 3, Article 15, Publication date: Jul. 2009. (58 pgs).

He et al., "Detecting session boundaries from Web user logs." In Proceedingsof of the BCS-IRSG 22nd Annual Colloquium on Information Retrieval Research (2000). (10 pgs).

Frank et al., "Role Mining with Probabilistic Models." Journal ACM Transactions on Information and System Security (TISSEC) vol. 15 Issue 4, Article No. 15 (2013). (30 pgs).

* cited by examiner

AUTOMATIC ROLE TUNING IN A COMPUTER SYSTEM

BACKGROUND

The present disclosure relates in general to the management of roles that control user access to computer systems. More specifically, the present disclosure relates to systems and methodologies for the automated tuning of such roles, wherein a given individual may be assigned to multiple roles, and wherein a given individual having multiple roles may perform actions that belong to more than one of that individual's assigned roles.

Computer systems utilize access permissions to allow individuals to gain access to and perform prescribed operations or actions within the computer system. In general, a permission grants the holder of the permission authorization to perform an operation on a specific object, such as a computer file.

Role-based access control (RBAC) is an access control technology used in a variety of computer systems to restrict system access to authorized users. Following this technology, a role may be defined as a set of permissions. Roles are created for various job functions, and users are assigned to particular roles. Through the assignment to role, users receive permission to access certain data or to perform specific operations. Once users are assigned to roles, each role could be seen as a User-Permission-Assignment (UPA) table.

In an ideal arrangement, only those users who have a current business requirement to access a given set of computer resources should possess the respective permissions to access such resources. However, ongoing changes occur in both the information technology (IT) environment and the personnel of an organization. For example, servers can be decommissioned and new servers can be added or introduced. Organization employees come and go. These natural changes are likely to result in UPAs becoming obsolete or non-optimal over time. Inaccurate, obsolete, overly generous or overly provisioned computer access permissions can create significant security risks. In order to account for these changes, roles that are initially defined and deployed in an RBAC system should thereafter be assessed and certified at specified time intervals. It is, however, a challenge to regularly assess and certify permissions, particularly in large and disperse IT environments having millions of users and permissions.

Role tuning (or adjustment) is the process of analyzing roles to achieve optimal security administration based on the role each individual plays within an organization. Some known role adjustment methodologies include the analysis of logs of actual access events performed by users. However, such known role adjustment methodologies rely on the assumption that either the role information (i.e., information that identifies under which role a user performs the action) is present in the log file or the user could be assigned to a single role. However, in practice the information that identifies the role under which a user performs the action may be unavailable, and a given individual may be assigned to multiple roles. An individual having multiple roles will likely perform access events that fall into more than one role. Other anomaly access event patterns can emerge that are not addressed by known role adjustment techniques.

Accordingly, it is desirable to provide role tuning systems and methodologies that better account for the realities of how roles (or appropriative UPAs) are actually utilized.

SUMMARY

Embodiments are directed to a computer-based system for tuning roles. The system includes a memory and a processor system communicatively coupled to the memory. The processor system is configured to receive at least one database access log file and existing role definitions of the system. For each role, the processor system is further configured to create an existing user to permission assignment (EUPA) based at least in part on the existing role definitions of the system. For each role, the processor system is further configured to identify logical sessions in the at least one database access log file and create a demonstrated user to permission assignment (DUPA) formed a least in part from data of the identified logical sessions. For each role, the processor system is further configured to create a final user to permission assignment (FUPA) including a function of the EUPA and the DUPA.

Embodiments are further directed to a computer implemented method for tuning roles. The method includes receiving, by a processor system, at least one database access log file and existing role definitions of the system. The method further includes, for each role, creating a EUPA based at least in part on the existing role definitions of the system. The method further includes, for each role, identifying logical sessions in the at least one database access log file and creating a DUPA formed at least in part from data of the identified logical sessions. The method further includes, for each role, creating a FUPA comprising a function of the EUPA and the DUPA.

Embodiments are further directed to a computer program product for tuning roles. The computer program product includes a computer readable storage medium having program instructions embodied therewith, wherein the computer readable storage medium is not a transitory signal per se. The program instructions are readable by a processor system to cause the processor system to perform a method. The method includes receiving, by the processor system, at least one database access log file and existing role definitions of the system. The method further includes, for each role, creating a EUPA based at least in part on the existing role definitions of the system. The method further includes, for each role, identifying logical sessions in the at least one database access log file and creating a DUPA formed at least in part from data of the identified logical sessions. The method further includes, for each role, creating a FUPA comprising a function of the EUPA and the DUPA.

Additional features and advantages are realized through the techniques described herein. Other embodiments and aspects are described in detail herein. For a better understanding, refer to the description and to the drawings.

BRIEF DESCRIPTION OF THE DRAWINGS

The subject matter which is regarded as the present disclosure is particularly pointed out and distinctly claimed in the claims at the conclusion of the specification. The foregoing and other features and advantages are apparent from the following detailed description taken in conjunction with the accompanying drawings in which:

Figure 1:
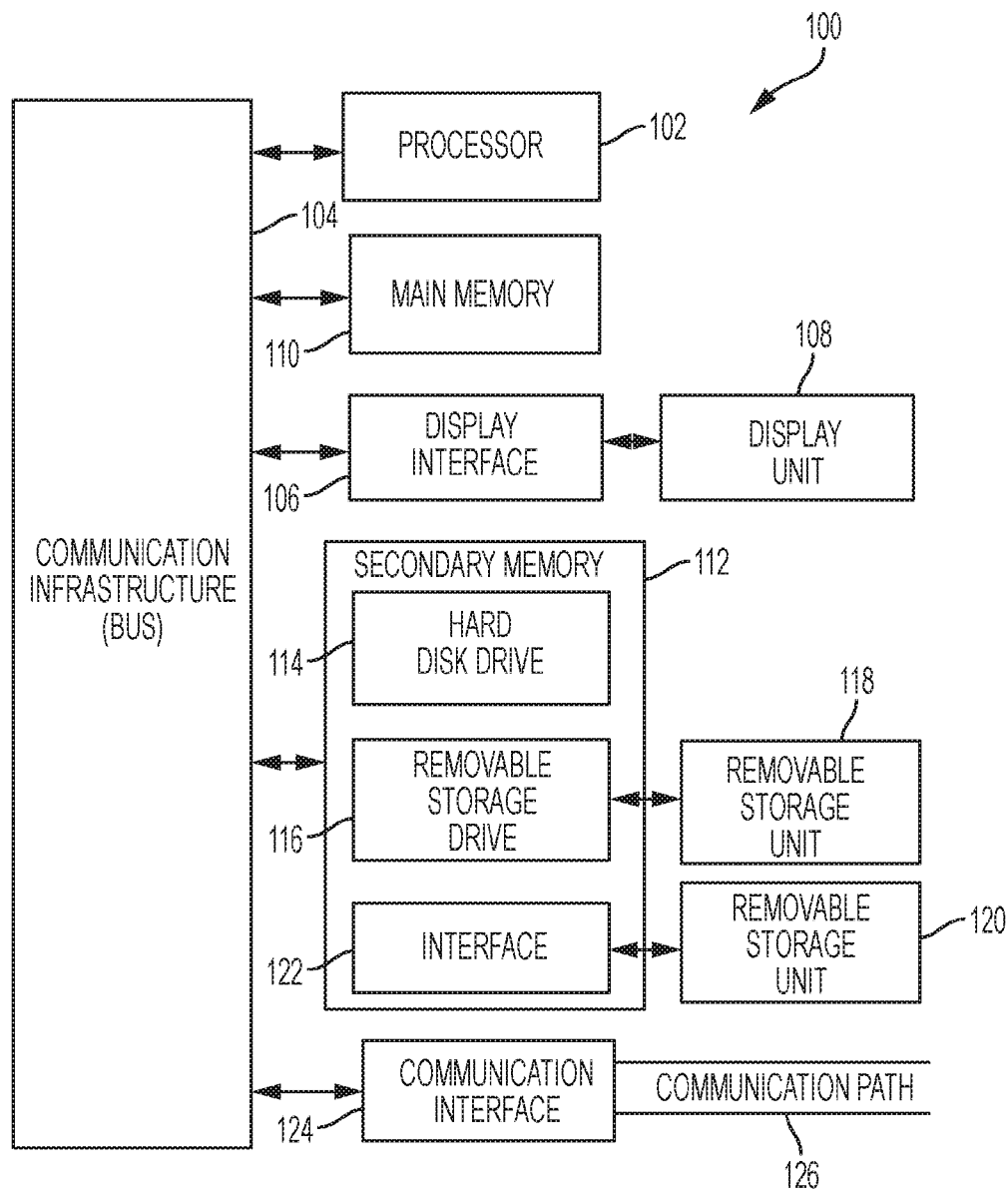
FIG. 1 depicts an exemplary computer system capable of implementing one or more embodiments of the present disclosure.

In the accompanying figures and following detailed description of the disclosed embodiments, the various elements illustrated in the figures are provided with three or four digit reference numbers. The leftmost digit(s) of each reference number corresponds to the figure in which its element is first illustrated.

DETAILED DESCRIPTION

Various embodiments of the present disclosure will now be described with reference to the related drawings. Alternate embodiments may be devised without departing from the scope of this disclosure. It is noted that various connections are set forth between elements in the following description and in the drawings. These connections, unless specified otherwise, may be direct or indirect, and the present disclosure is not intended to be limiting in this respect. Accordingly, a coupling of entities may refer to either a direct or an indirect connection.

Turning now to an overview of the present disclosure, one or more embodiments provide systems and methodologies for the automated tuning of roles, wherein a given individual may be assigned to multiple roles, and wherein a given individual having multiple roles may perform actions that belong to more than one of that individual's assigned roles. The automated tuning of computer access roles is carried out by a disclosed role tuning process that automatically reduces the administrative burden of maintaining and updating security roles required for one or more computer systems. The role tuning process of the present disclosure analyzes at specified time intervals logs of actual access events performed by users, taking into account that a given individual may be assigned to multiple roles in the system. The disclosed role tuning methodology further takes into account that individuals having multiple roles will likely perform access events that fall into more than one role. The disclosed role tuning methodology further takes into account other anomaly access event patterns that can emerge, and provides information pertaining to certain roles such as recommendations, warnings, notifications and updates in regard thereto. Accordingly, the disclosed role tuning functionality accounts for the realities of how roles or appropriative UPAs are actually utilized.

Turning now to a more detailed description of the present disclosure, FIG. 1 illustrates a high level block diagram showing an example of a computer-based simulation system 100 useful for implementing one or more embodiments. Although one exemplary computer system 100 is shown, computer system 100 includes a communication path 126, which connects computer system 100 to additional systems and may include one or more wide area networks (WANs) and/or local area networks (LANs) such as the internet, intranet(s), and/or wireless communication network(s). Computer system 100 and additional system are in communication via communication path 126, e.g., to communicate data between them.

Computer system 100 includes one or more processors, such as processor 102. Processor 102 is connected to a communication infrastructure 104 (e.g., a communications bus, cross-over bar, or network). Computer system 100 can include a display interface 106 that forwards graphics, text, and other data from communication infrastructure 104 (or from a frame buffer not shown) for display on a display unit 108. Computer system 100 also includes a main memory 110, preferably random access memory (RAM), and may also include a secondary memory 112. Secondary memory 112 may include, for example, a hard disk drive 114 and/or a removable storage drive 116, representing, for example, a floppy disk drive, a magnetic tape drive, or an optical disk drive. Removable storage drive 116 reads from and/or writes to a removable storage unit 118 in a manner well known to those having ordinary skill in the art. Removable storage unit 118 represents, for example, a floppy disk, a compact disc, a magnetic tape, or an optical disk, etc. which is read by and written to by removable storage drive 116. As will be appreciated, removable storage unit 118 includes a computer readable medium having stored therein computer software and/or data.

In alternative embodiments, secondary memory 112 may include other similar means for allowing computer programs or other instructions to be loaded into the computer system. Such means may include, for example, a removable storage unit 120 and an interface 122. Examples of such means may include a program package and package interface (such as that found in video game devices), a removable memory chip (such as an EPROM, or PROM) and associated socket, and other removable storage units 120 and interfaces 122 which allow software and data to be transferred from the removable storage unit 120 to computer system 100.

Computer system 100 may also include a communications interface 124. Communications interface 124 allows software and data to be transferred between the computer system and external devices. Examples of communications interface 124 may include a modem, a network interface (such as an Ethernet card), a communications port, or a PCM-CIA slot and card, etcetera. Software and data transferred via communications interface 124 are in the form of signals which may be, for example, electronic, electromagnetic, optical, or other signals capable of being received by communications interface 124. These signals are provided to communications interface 124 via communication path (i.e., channel) 126. Communication path 126 carries signals and may be implemented using wire or cable, fiber optics, a phone line, a cellular phone link, an RF link, and/or other communications channels.

In the present disclosure, the terms "computer program medium," "computer usable medium," and "computer readable medium" are used to generally refer to media such as main memory 110 and secondary memory 112, removable storage drive 116, and a hard disk installed in hard disk drive 114. Computer programs (also called computer control logic) are stored in main memory 110 and/or secondary memory 112. Computer programs may also be received via communications interface 124. Such computer programs, when run, enable the computer system to perform the features of the present disclosure as discussed herein. In particular, the computer programs, when run, enable processor 102 to perform the features of the computer system. Accordingly, such computer programs represent controllers of the computer system.

Figure 2:
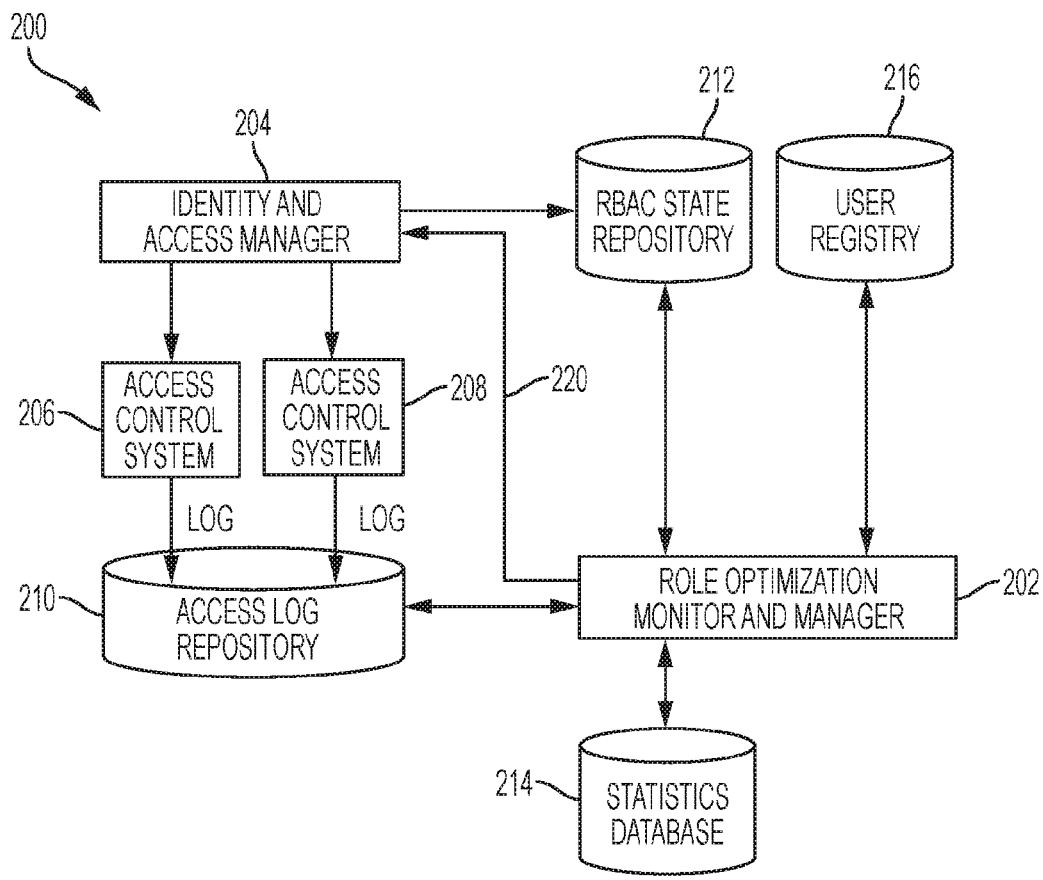
FIG. 2 depicts a block diagram illustrating the functional modules of a system according to one or more embodiments.

FIG. 2 depicts a block diagram illustrating the functional modules of a system 200 according to one or more embodiments. System 200 includes a role optimization monitor and management component 202, also referred to herein as a role optimization manager (ROMM) for convenience. ROMM 202 directs or manages a role tuning process carried out by system 200 that automatically reduces the administrative burden of maintaining and updating security roles required for one or more computer systems. As described in greater detail in connection with the descriptions of FIGS. 3 and 4, the role tuning process of ROMM 202 analyzes UPAs to achieve optimal security administration based at least in part on actual access data logs (i.e., access log repository 210) of system 200. ROMM 202 analyzes at specified time intervals logs of actual access events performed by users, however, unlike known role tuning methodologies, ROMM 202 takes into account that a given individual may be assigned to multiple roles and UPAs in system 200. ROMM 202 further takes into account that individuals having multiple roles will likely perform access events that fall into more than one role. ROMM 202 further takes into account other anomaly access event patterns that can emerge. ROMM 202 provides information pertaining to certain roles to access management component 204, such as recommendations, warnings, notifications and updates in regard thereto, over a link 220.

Accordingly, system 200 and ROMM 202 provide role tuning functionality that better accounts for the realities of how UPAs are actually utilized. System 200 enables respective roles to be tuned in order to authorize only the least or minimum access privileges that are required for operation of a given computer access control system. System 200 also notifies administrators of role drift, or changes that impact role quality, and proposes modifications in response to the role drift. Moreover, system 200 provides a platform for collecting and using relevant statistical data. Although in the disclosed embodiment roles are provided or defined in accordance with an RBAC policy, the systems and methodologies of the present disclosure may be utilized in connection with any type of computer access control methodology, now known or later developed.

Referring still to FIG. 2, system 200 further includes an identity and access manager 204, an access control system 206, another access control system 208, access log repository 210, ROMM 202, RBAC state repository 212, user registry 216, statistics database 214 and monitoring policy repository 218, configured and arranged as shown. Identity and access management component 204 enables a user to log into each of two or more disparate computer systems, wherein access is authorized in accordance with the RBAC policy. Thus, the user can access a system if she or he is included in a role that provides permission for such access. Access control systems 206 and 208 represent different computer systems, wherein system access roles and permissions are furnished or provisioned to users by identity and access manager component 204.

Access log repository 210 contains an access event log for each access control system such as system 206 or 208. Whenever one of these systems is accessed by a user, based on a permission provided by a role, certain information is entered into the access event log for that system or resource. The entered information can include a timestamp at the beginning of the access event and the identity of the user. Further information may include the associated system and resource, the status thereof and the action taken.

In addition to resource access events, log repository 210 contains a historical record showing the activations of respective roles and permissions, which are authorized by the RBAC policy. Recorded role activation data may include activation timestamp, user, role and permission identities, the associated access control system, and termination timestamp. Access log repository 210 performs the further function of aggregating log data from a multitude of access control systems.

System 200 further includes RBAC state repository 212, statistics database 214 and user registry 216 and monitoring policy repository 218. Repository 212 provides a location for storing current data pertaining to the roles and permissions assigned to users of respective access control systems, such as systems 206 and 208, in accordance with the RBAC policy. As ROMM 202 processes data pertaining to respective roles, statistical data for further role analysis is collected and updated in statistics database 214. Examples of such statistical data include but are not limited to usage frequencies, role activations, permissions accessed and role size. Statistics database 214 provides measures for specified analytics applications, exemplified by applications for reports, machine learning, IT security risks and multidimensional online analytical processing (MOLAP) visualization. User registry 216 provides a list of users of systems such as systems 206 and 208.

Figure 3:
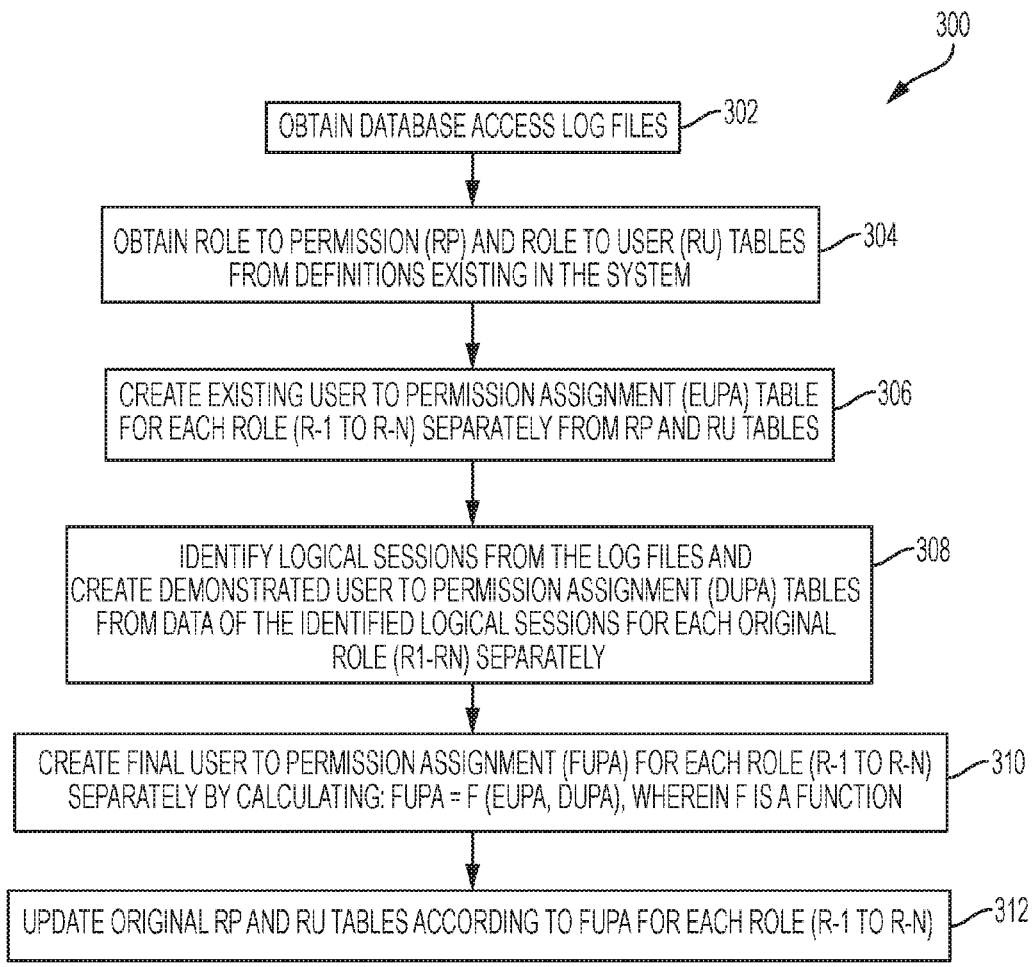
FIG. 3 depicts a flow diagram illustrating a methodology according to one or more embodiments.
Figure 4:
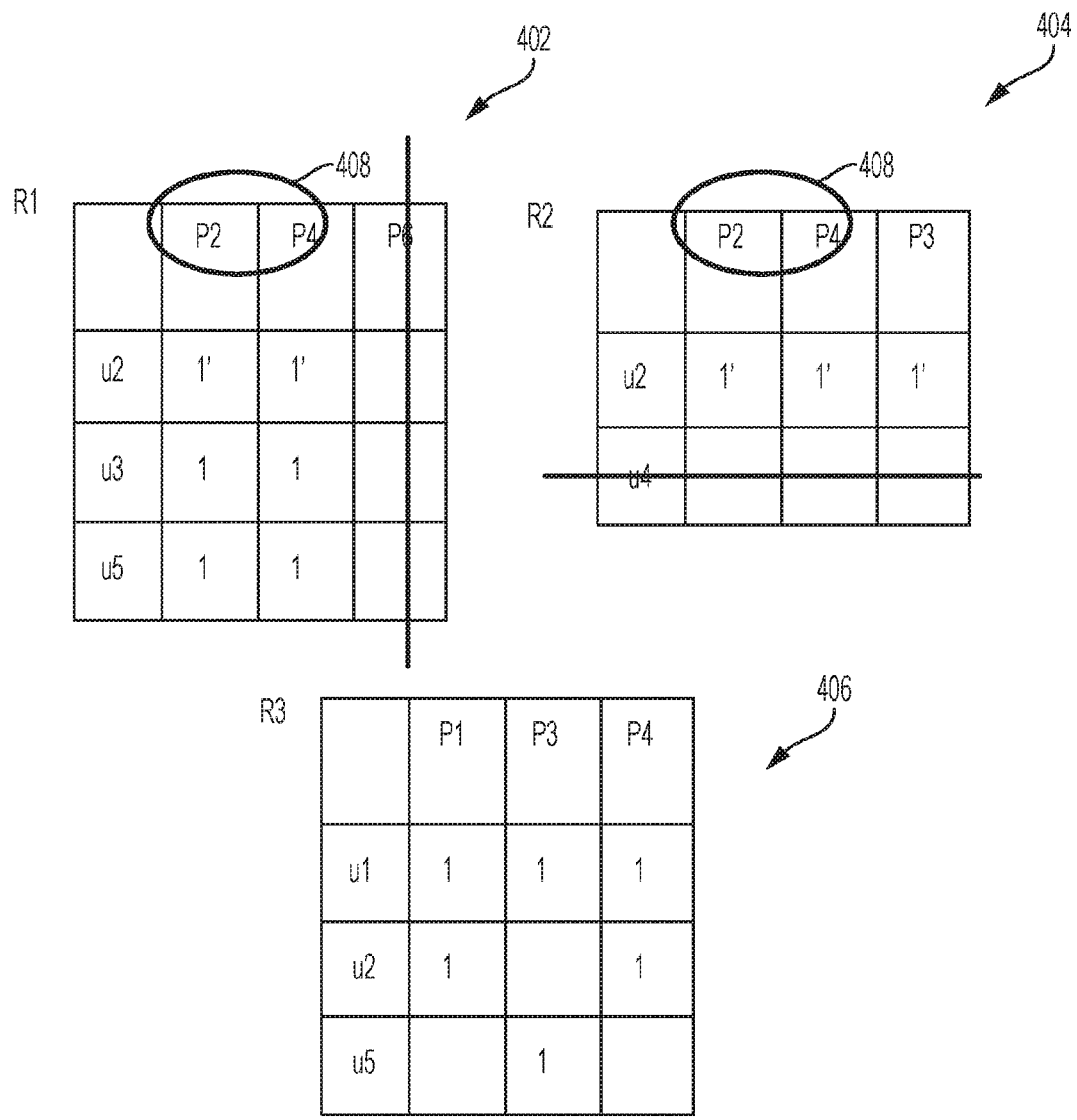
FIG. 4 depicts a diagram illustrating examples of demonstrated user to permission assignment (DUPA) tables created for each role according to one or more embodiments.

FIG. 3 depicts a flow diagram illustrating a methodology 300 performed by system 200 and ROMM 202 according to one or more embodiments. FIG. 4 depicts a diagram illustrating examples of "demonstrated user to permission assignment" (DUPA) tables 402, 404, 406 created for each role according to methodology 300. The operation of system 200 and ROMM 202 will now be provided with reference to methodology 300 and DUPA tables 402, 404 and 406.

Methodology 300 begins a block 302 by obtaining database access log files from access log repository 210. Block 304 obtains role to permission (RP) tables and role to user (RU) tables from definitions existing in the system, such as for example, exiting definitions in RBAC state repository 212 and user registry 216. RP tables map existing roles to the permissions allowed by the existing roles. RU tables map existing roles to existing users.

Block 306 creates existing user to permission assignment (EUPA) tables for each original role (R1 to RN). The EUPA tables map existing users to existing permissions independently of actual user access reflected in access log repository 210. For each original role (R1 to RN), block 308 identifies logical sessions in access log repository 210 and creates demonstrated user to permission assignment (DUPA) tables formed at least in part from data of the identified logical sessions. Whole identified logical sessions are assigned to appropriative roles (i.e., roles containing all permissions existing in identified logical sessions).

A logical session (or business transaction) is a sequence of SQL queries that could be applied on a database/system in a single business oriented task (e.g. create supplier, issue an order, etc.). All logical sessions are identified from access log repository 210 as those containing a sequence of SQL queries. Each row in the access log repository 210 may contain data such as USER_ID, SESSION_ID, SQL_QUERY_DESCRIPTION (e.g. SELECT A from B), TIME_STAMP, etc. A new SESSION_ID is created every time a user (e.g., u2) logs into the database/system and exists until the user logs out. Thus, SESSION_ID represents the physical session of the user, and a physical session could contain many logical sessions. Indeed, during the physical session, a user could perform many different actions (e.g. create supplier, issue an order, etc.), and each such action (i.e., logical session), from the database perspective, is a sequence of transactions.

Such transaction sequences can be identified using a "timeout" method, wherein the time between activities within the same session is identified as usually being much shorter than the time between separate sessions. An example of a timeout method is described in a publication by He D. and Goker A. titled "Detecting Session Boundaries from Web User Logs," 22nd Annual Colloquium on IR Research, IRSG 2000, Cambridge, UK (2000) pages 57-66, the entire disclosure of which is incorporated herein by reference. Such transactions can also be identified using statistical language modeling (i.e., n-gram modeling) based a session identification method. The method employs an information theoretic approach to identify session boundaries dynamically by measuring the change of information in the sequence of requests. It has been demonstrated to be more effective than timeout method. An example of a statistical language modeling approach is described in a publication by Yao O., An A, Huang X. titled "Applying Language Modeling to Session Identification from Database Trace Logs," Knowledge Information Systems, 10(4): pages 473-504 (2006), the entire disclosure of which is incorporated by reference herein.

Thus, the DUPA tables map existing users to existing permissions based on logical sessions identified from the actual user access reflected in access log repository 210. Example DUPA tables are shown in FIG. 4, wherein DUPA tables 402, 404, 406 are provided for three roles, R1, R2 and R3. Three roles are provided for ease of illustrated. In practice, significantly more than three roles may be used. DUPA table 402 maps users u2, u3 and u5 to the permissions for R1, namely permissions P2, P4 and P6. DUPA table 404 maps users u2 and u4 to the permissions for R2, namely permissions P2, P4 and P3. DUPA table 406 maps users u1, u2 and u5 to the permissions for R3, namely permissions P1, P3 and P4.

Based on data of the identified logical sessions derived from access log repository 210, the cells of DUPA tables 402, 404, 406 are filled in the following manner. The numeral "1" is placed in a cell to indicate that the identified user performed the corresponding permission. A cell is left blank to indicate that the identified user did not perform the corresponding permission. A special character (e.g., 1') is placed in a cell to indicate that more than one mapping of the logical session is possible. Although the use of logical sessions significantly reduces conflicts, they can still exist between identified logical sessions. This may be caused, for example, by a user having more than one assigned role, and by the assigned roles having one or more logical sessions in common. An example is shown in FIG. 4, where u2 has been assigned R1 and R2, and data from access log repository 210 indicate that u2 performed permissions P2, P4 and P3. Assuming that P2 and P4 are an identified logical session 408, the logical session <P2;P4> could apply to u2's R1 or R2. The special character "1'" is used as a placeholder until the mapping conflict for u2 can be resolved by subsequent processing, an example of which is shown in block 310 and described in greater detail below.

Block 310 creates final user to permission assignment (FUPA) tables for each original role (R1 to RN) separately by determining F (EUPA, DUPA), wherein F is a function. Block 312 then updates original RP and RU tables according to FUPA, and more particularly, according to the function F. The function F takes into account that a given individual may be assigned to multiple roles and UPAs in the system. The function F further takes into account that individuals having multiple roles will likely perform access events that fall into more than one role. The function F further takes into account that the identified logical sessions may still include conflicts that need to be resolved. The function F further takes into account other anomaly access event patterns that can emerge, and provides information pertaining to certain roles such as recommendations, warnings, notifications and updates in regard thereto. Accordingly, the function F accounts for the realities of how UPAs are actually utilized.

According to one or more embodiments, the function F may be implemented in the following manner. The function F may resolve the mapping conflict for u2 by, for each candidate role, calculating the probability of identified logical session 408 will be demonstrated by a user assigned to the role, and then mapping the logical session to the role having the largest probability. In the disclosed example, for R1 the probabilities are Pr1 (<P2, P4>)=(the number of user in R1 that demonstrated the logical session <P2,P4>)/(the total number of user in R1)=3/3=1. For R2, Pr2 (<P2, P4>)=1/1=1. For situations in which the probabilities are equal, additional known optimization techniques may be applied to resolve the conflict.

The function F performs the following updates. If there are empty rows/columns in DUPA tables 402, 404, 406 (e.g., P6 of R1, and u4 of R2), remove the appropriate permission from the role, or remove the appropriate user from the role. If there are empty cells in DUPA tables (e.g. 406), determine if the user is an outlier in the role. This can be done by employing anomaly detection techniques to build a profile of the "normal" behavior and to use the "normal" profile to detect anomalies. A profile can be patterns or summary statistics for the overall population, and anomalies are observations whose characteristics differ significantly from the normal profile. Given a role, e.g., R1, R2 or R3, the profile will characterize the typical behavior of users within the role. If a user in the role behaves significantly differently, it is considered as an outlier in the role. A survey of outlier detection techniques is provided in a publication by Varun Chandola, Arindam Banerjee, Vipin Kumar, titled "Anomaly Detection: A Survey," Journal ACM Computing Surveys (CSUR), Volume 41, Issue 3, July 2009, the entire disclosure of which is incorporated by reference herein. If a user is determined to be an outlier in a role, attempt to assign problematic users to other roles. If there are not-assigned problematic users, the roles should be split.

Accordingly, it can be seen from the foregoing specification and drawings that the present disclosure provides systems and methodologies for the automated tuning of roles, wherein a given individual may be assigned to multiple roles, and wherein a given individual having multiple roles may perform actions that belong to more than one of that individual's assigned roles. The automated tuning of roles is carried out by the disclosed role tuning process, which automatically reduces the administrative burden of maintaining and updating security roles required for one or more computer systems. The role tuning process of the present disclosure analyzes at specified time intervals logs of actual access events performed by users, taking into account that a given individual may be assigned to multiple roles (appropriative UPAs) in the system. The disclosed role tuning methodology further takes into account that individuals having multiple roles will likely perform access events that fall into more than one role. The disclosed role tuning methodology further takes into account other anomaly access event patterns that can emerge, and provides information pertaining to certain roles such as recommendations, warnings, notifications and updates in regard thereto. Accordingly, the disclosed role tuning functionality accounts for the realities of how UPAs are actually utilized.

Figure 5:
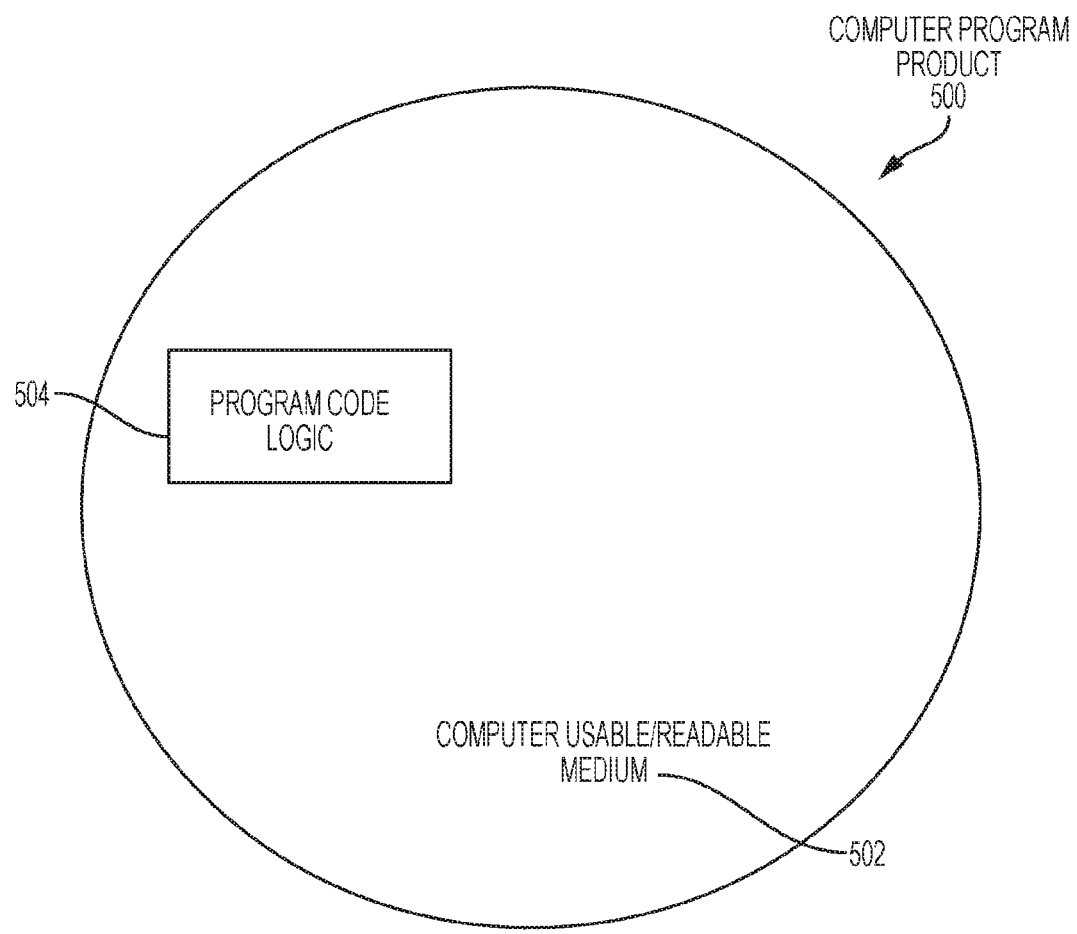
FIG. 5 depicts a computer program product in accordance with one or more embodiments.

Referring now to FIG. 5, a computer program product 500 in accordance with an embodiment that includes a computer readable storage medium 502 and program instructions 504 is generally shown.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

It will be understood that those skilled in the art, both now and in the future, may make various improvements and enhancements which fall within the scope of the claims which follow.

What is claimed is:

1. A computer-based system for tuning roles, the system comprising:
    a memory; and
    a processor system communicatively coupled to the memory;
    the processor system configured to:
    receive at least one database access log file;
    receive existing role definitions of the system;
    for each role, create an existing user to permission assignment (EUPA) based at least in part on the existing role definitions of the system;
    for each role, identify, using the processor system, logical sessions in the at least one database access log file and create a demonstrated user to permission assignment (DUPA) formed at least in part from data of the identified logical sessions; and
    for each role, create a final user to permission assignment (FUPA) comprising a function of the EUPA and the DUPA;
    wherein the DUPA comprises a plurality of cells;
    wherein each cell of the DUPA comprises a portion of the data of the identified logical sessions;
    wherein the function comprises:
    removing a user from a role for which all cells of the user contain none of the data of the identified logical sessions; or
    removing permissions from a role for which all cells of the permissions contain none of the data of the identified logical sessions.

2. The system of claim 1, wherein the processor is further configured to:
    create original role to permissions (RP) tables and original role to user (RU) tables from the existing role definitions;
    wherein, creating the EUPA based at least in part on the existing roles of the system comprises creating the EUPA based at least in part on the original RP tables and the original RU tables.

3. The system of claim 2, wherein the processor is further configured to:
    for each role, update the original RP tables and the original RU tables based at least in part on the FUPA.

4. The system of claim 1, wherein the function further comprises:
    identifying conflicts in the DUPA; and
    resolving the identified conflicts.

5. The system of claim 1, wherein the function further comprises:
    identifying an outlier user based at least in part on the data of the identified logical sessions; and
    resolving the outlier user by either assigning the outlier user to another role or splitting the outlier user's role.

6. The system of claim 1, wherein:
    the DUPA comprises a table having rows and columns;
    the cells comprise intersections of the rows and the columns;
    each of either the rows or the columns identifies a user; and
    each of either the rows or the columns identifies a permission.

7. A computer implemented method for tuning roles, the method comprising:
    receiving, by a processor system, at least one database access log file;
    receiving, by the processor system, existing role definitions of the system;
    for each role, creating an existing user to permission assignment (EUPA) based at least in part on the existing role definitions of the system;
    for each role, identifying, using the processor system, logical sessions in the at least one database access log file and creating a demonstrated user to permission assignment (DUPA) formed at least in part from data of the identified logical sessions; and
    for each role, creating a final user to permission assignment (FUPA) comprising a function of the EUPA and the DUPA;
    wherein the DUPA comprises a plurality of cells;
    wherein each cell of the DUPA comprises a portion of the data of the identified logical sessions;
    wherein the function comprises:
    removing a user from a role for which all cells of the user contain none of the data of the identified logical sessions; or
    removing permissions from a role for which all cells of the permissions contain none of the data of the identified logical sessions.

8. The computer implemented method of claim 7 further comprising:
    creating original role to permissions (RP) tables and original role to user (RU) tables from the existing role definitions;
    wherein, creating the EUPA based at least in part on existing roles of the system comprises creating the EUPA based at least in part on the original RP tables and the original RU tables.

9. The computer implemented method of claim 8 further comprising:
    for each role, updating the original RP tables and the original RU tables based at least in part on the FUPA.

10. The computer implemented method of claim 7, wherein the function further comprises:
    identifying conflicts in the DUPA; and
    resolving the identified conflicts.

11. The computer implemented method of claim 7, wherein the function further comprises:
    identifying an outlier user based at least in part on the data of the identified logical sessions; and resolving the outlier user by either assigning the outlier user to another role or splitting the outlier user's role.

12. The computer implemented method of claim 7, wherein:
    the DUPA comprises a table having rows and columns;
    the cells comprise intersections of the rows and the columns;
    each of either the rows or the columns identifies a user; and
    each of either the rows or the columns identifies a permission.

13. A computer program product for tuning roles, the computer program product comprising:
    a computer readable storage medium having program instructions embodied therewith, wherein the computer readable storage medium is not a transitory signal per se, the program instructions readable by a processor system to cause the processor system to perform a method comprising:
    receiving, by the processor system, at least one database access log file;
    receiving, by the processor system, existing role definitions of the system;
    for each role, creating an existing user to permission assignment (EUPA) based at least in part on the existing role definitions of the system;
    for each role, identifying, using the processor system, logical sessions in the at least one database access log file and creating a demonstrated user to permission assignment (DUPA) formed at least in part from data of the identified logical sessions; and
    for each role, creating a final user to permission assignment (FUPA) comprising a function of the EUPA and the DUPA;
    wherein the DUPA comprises a plurality of cells;
    wherein each cell of the DUPA comprises a portion of the date of the identified logical sessions;
    wherein the function comprises:
    removing a user from a role for which all cells of the user contain none of the data of the identified logical sessions; or
    removing permissions from a role for which all cells of the permissions contain none of the data of the identified logical sessions.

14. The computer program product of claim 13 further comprising:
    creating original role to permissions (RP) tables and original role to user (RU) tables from the existing role definitions;
    wherein, creating the EUPA based at least in part on the existing roles of the system comprises creating the EUPA based at least in part on the original RP tables and the original RU tables; and
    for each role, updating the original RP tables and the original RU tables based at least in part on the FUPA.

15. The computer program product of claim 13, wherein the function further comprises:
    identifying conflicts in the DUPA; and
    resolving the identified conflicts.

16. The computer program product of claim 13, wherein the function further comprises:
    identifying an outlier user based at least in part on the data of the identified logical sessions; and
    resolving the outlier user by either assigning the outlier user to another role or splitting the outlier user's role.

17. The computer program product of claim 13, wherein:
    the DUPA comprises a table having rows and columns;
    the cells comprise intersections of the rows and the columns;
    each of either the rows or the columns identifies a user; and
    each of either the rows or the columns identifies a permission.

* * * * *